United States Patent [19]
Randolph et al.

[11] 3,880,122
[45] Apr. 29, 1975

[54] POULTRY INSEMINATOR

[76] Inventors: Arthur J. Randolph, 4711 Sonoma Hwy.; Albertus G. Horsting, 6685 Sonoma Hwy., both of Santa Rosa, Calif. 95405

[22] Filed: Aug. 2, 1973

[21] Appl. No.: 385,176

Related U.S. Application Data
[63] Continuation-in-part of Ser. No. 315,421, Dec. 15, 1972, Pat. No. 3,774,578.

[52] U.S. Cl................................ 119/97 R; 17/44.1
[51] Int. Cl............................................. A01k 37/00
[58] Field of Search ..... 119/97 R, 103; 17/11, 44.1; 56/328 TS

[56]          References Cited
UNITED STATES PATENTS
2,548,013    4/1951    Garfield ........................... 119/97 R
3,178,875    4/1965    McEwen ......................... 56/328 TS
3,623,186    11/1971   Parek ................................. 17/11

Primary Examiner—Louis G. Mancene
Assistant Examiner—J. N. Eskovitz
Attorney, Agent, or Firm—Gregg, Hendricson, Caplan & Becker

[57]          ABSTRACT

Apparatus for gripping poultry in a position to facilitate artificial insemination thereof. Manually controllable leg gripping means are mounted upon means defining an insemination station with control means disposed in position for ready actuation by operators.

6 Claims, 6 Drawing Figures

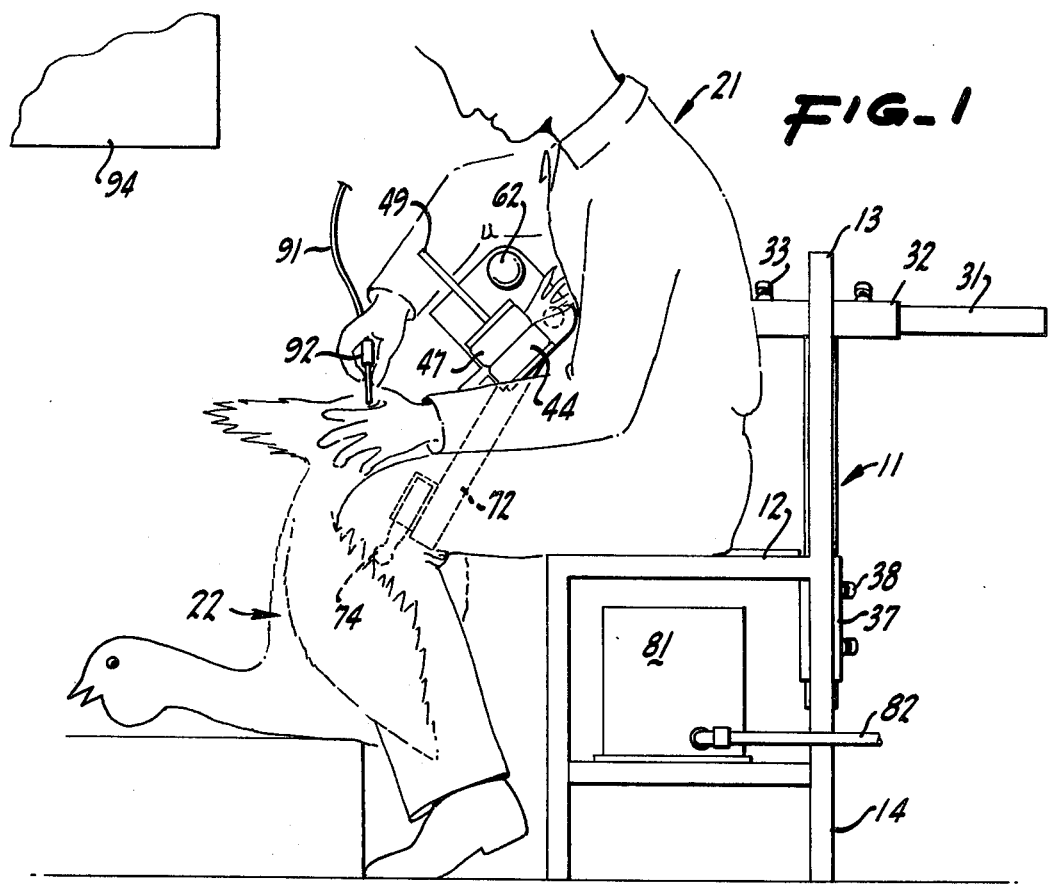
FIG. 1
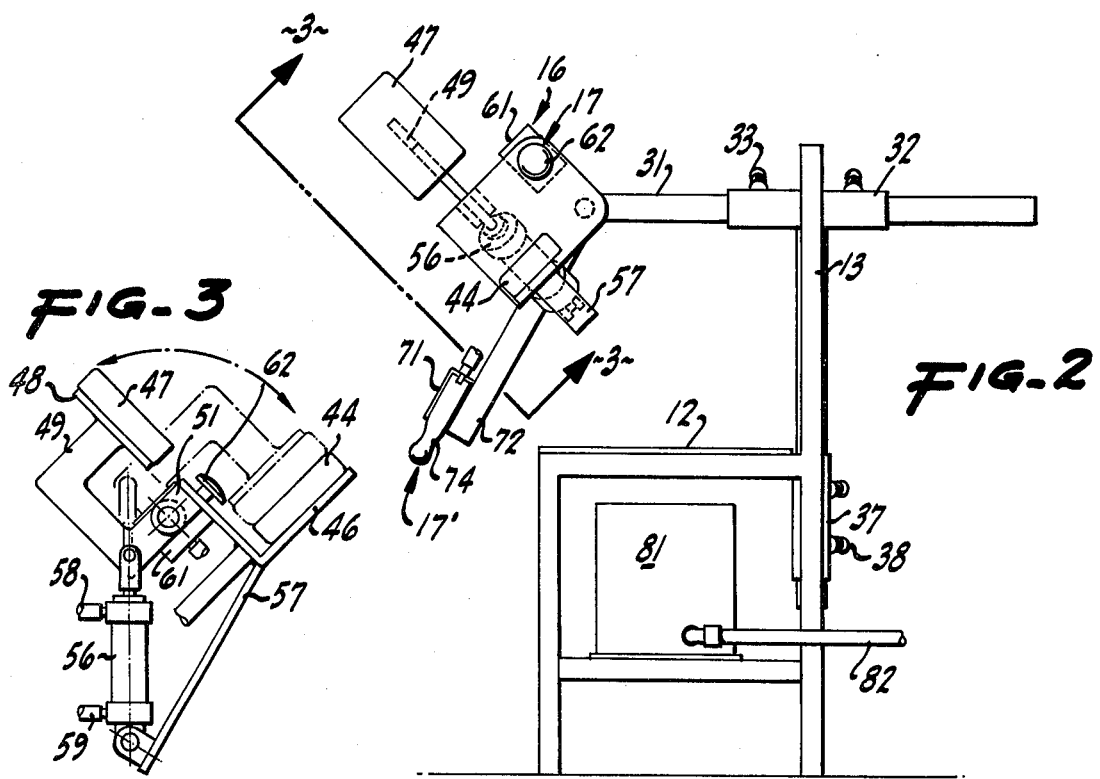
FIG. 3
FIG. 2

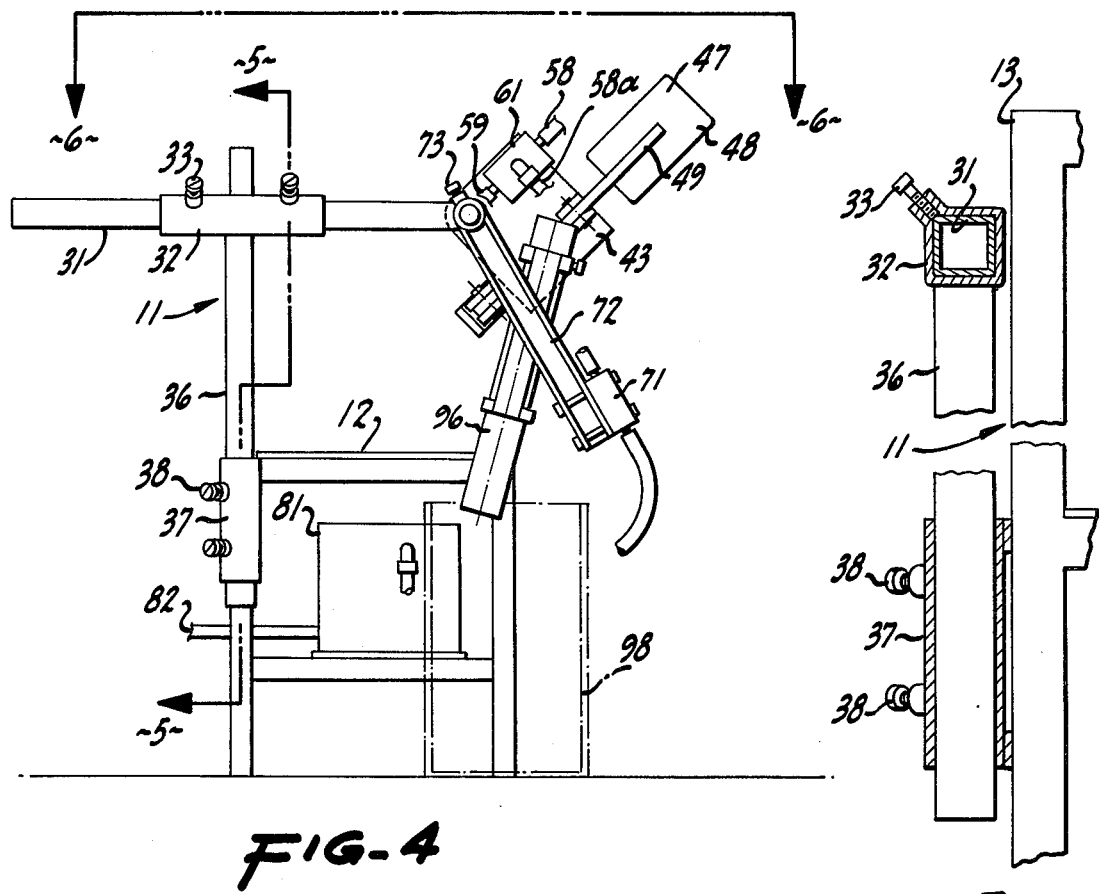
FIG.-4
FIG.-5
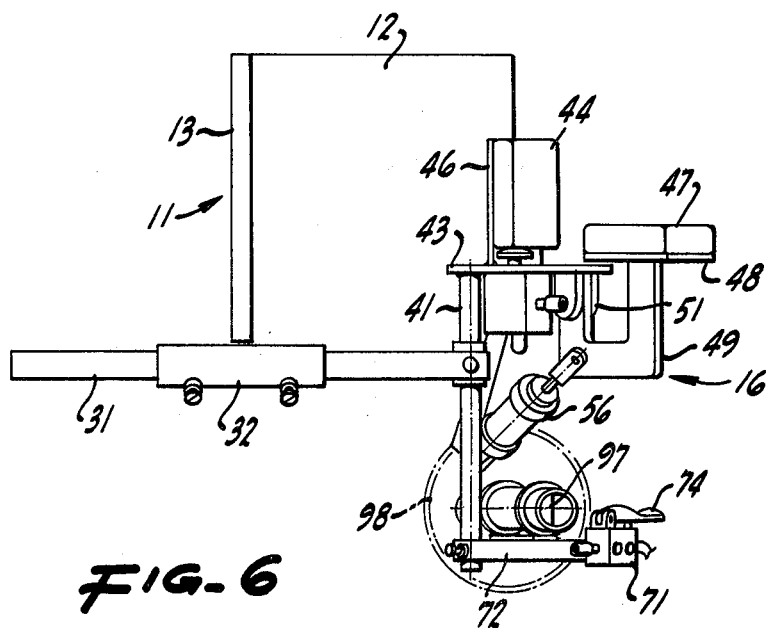
FIG.-6

POULTRY INSEMINATOR

This a Continuation-in-Part of our co-pending U.S. Pat. application Ser. No. 315,421 filed in the U.S. Patent Office on Dec. 15, 1972 for Poultry Handling Apparatus and now U.S. Pat. No. 3,774,578.

BACKGROUND OF INVENTION

The production of poultry for market is facilitated by artificial insemination of hens and this operation is carried out manually by trained personnel. Particularly with regard to large birds such as turkeys, there are certain difficulties in handling and holding of the hens during the artificial insemination operation. It is necessary for artificial insemination that a hen turkey or the like be held in an immobile position and the prior art attempts to accomplish this purely by hand have been unsatisfactory. There is disclosed in my co-pending patent application, Ser. No. 315,421, filed Dec. 15, 1972 for Poultry Handling Apparatus, apparatus for gripping and transporting poultry that is highly useful in artificial insemination of poultry. The present invention provides a materially simplified apparatus for artificial insemination of poultry wherein a minimum of mechanical complexity is involved.

SUMMARY OF INVENTION

The present invention comprises means defining an insemination station including a seat for an operator or technician and adjustably mounting thereon poultry leg clamping means. Controls for the leg clamping means are particularly located such that a first operator may readily close the clamping means and an insemination operator may readily release the clamping means as, for example, by knee pressure, after insemination is completed.

The invention provides for proper positioning and immobilization of a hen for manual artificial insemination thereof. A first operator originally places the hen between a second operator's legs with the head downward and away from the second operator. The legs of the hen are positioned by the first operator on the clamping means adjustably positioned above a seat upon which the second operator sits. Clamp control means extends into position for actuation by the first operator and release by the second operator.

DESCRIPTION OF FIGURES

The present invention is illustrated as to a single preferred embodiment thereof in the accompanying drawings wherein:

FIG. 1 is a side elevational view of an insemination station in accordance with the present invention and including an illustration of an insemination operator and turkey located at such station;

FIG. 2 is an elevation view of the apparatus of the present invention;

FIG. 3 is an elevation view of the clamping means of the present invention taken in the plane 3—3 of FIG. 2;

FIG. 4 is a side elevation view taken in the opposite direction from FIG. 2 and illustrating the apparatus of the present invention;

FIG. 5 is a sectional view taken in the plane 5—5 of FIG. 4 to illustrate certain adjusting means incorporated in the present invention; and FIG. 6 is a plan view of the present invention taken in the plane 6—6 of FIG. 4.

DESCRIPTION OF THE PREFERRED EMBODIMENT

The present invention provides a station including means facilitating the artificial insemination of poultry. Although the present invention is applicable to various types of poultry, it is hereinafter described in connection with turkey insemination. It will be appreciated that a turkey hen that may weigh anywhere from 10 to 40 pounds or more is quite a handful for an individual to grip, pick up and hold immobile while attempting to carry out artificial insemination. Trained operators are employed to artificially inseminate hens and such operators become quite proficient in grasping and picking up hens but they do have difficulty holding hens for insemination. The present invention provides assistance in the immobilization of a hen after it has been picked up.

Referring first to FIGS. 1 and 2 it will be seen that a preferred embodiment of the present invention comprises a structure defining a chair 11 having a seat 12 and back 13 with legs 14 supporting the chair. Upon this chair there is adjustably mounted clamping means 16 having control means 17–17'.

Before preceding with a detailed description of the structure of the present invention, reference is made to the general manner in which the present invention is intended to be employed. As shown in FIG. 1 an operator 21 seats himself upon the chair 11 with the clamping means 16 then disposed generally in front of the operator slightly above lap level. A hen turkey 22, for example, is then disposed between the knees of the operator 21 by a second operator or worker who has picked up the turkey. The operator picks up the hen by gripping the legs just above the feet with one hand and gripping a wing of the turkey hen with the other. With the clamping means 16 open, the operator, lifting the turkey hen, then places the lower legs of the turkey in the clamping means and simultaneously actuates the control means 17 by hand pressure so that the clamping means closes about the turkey's legs and firmly engages same. The turkey hen is disposed then between the knees of the seated operator and the turkey's breast may rest upon the ground or upon a platform 23 provided therefor with the operator firmly gripping the side of the turkey with his knees. The hen turkey is then in position for artificial insemination. Upon completion of the insemination operation the seated operator actuates the control means 17', as by knee to open the clamping means 16 and spreading his knees apart allows the turkey's legs to fall to the floor or ground so that the turkey then walks away from the station. The operator is then ready to receive another hen to repeat the operation.

Release of the clamping means may be accomplished in a variety of ways, however, the present invention provides for this release to be located in position for ready use by the seated operator without slowing or impeding his primary operations. Although any part of the body may be employed to actuate release means it has been found that a knee operated release is preferable particularly inasmuch as the operator's knees are moved outwardly to remove pressure from the breast of the hen.

Considering now the structure of a preferred embodiment of the present invention, it will be seen that the clamping means 16 is carried upon a support arm 31 which is formed as a rectangular boxed beam slidably disposed in a rectangular cylinder 32 for horizontally adjustable positioning. A pair of set screws 33 extend through the cylinder 32 for tightening against the support arm 31 to fix the horizontal position of the clamping means. The cylinder 32 is carried on an upright member 36 preferably formed as a boxed beam having a rectangular cross section and slidably disposed vertically through a hollow open-ended rectangular support 37. This support 37 is firmly fixed to one side of the chair 11 engaging a leg 14 thereof as particularly illustrated in FIG. 5. A pair of set screws 38 extend in threaded engagement through the support 37 for clamping the upright 36 in adjustable vertical position. This then provides for positioning the clamping means at the desired height above the chair seat 12 and also at a desired distance in front of the chair back 13.

In the illustrated embodiment of the present invention the clamping means are disposed to the right of the chair as viewed by an operator sitting in the chair, inasmuch as a right-handed operator would normally perform the artificial insemination with his right hand. It will be appreciated that provision may be made herein to mounting the clamping means to the other side of the chair, i.e., the left side of an operator sitting in the chair for left-handed operators.

The clamping means 16 is mounted upon the outer or forward end of the support arm 31 by means of a horizontal transverse shaft 41 extending through a bracket on the outer end of the support arm. This shaft 41 extends in part over the seat 12 and at the end of the shaft over the seat there is mounted a plate 43 extending forwardly of the seat normal to the shaft. On the side of the plate 43 opposite the shaft 41 there is mounted a fixed pad 44 which may be backed by a support plate 46 secured to the plate 43 and extending perpendicularly therefrom. The pad 44 is disposed at an angle of about 45° to horizontal and is adapted to have the lower legs of a hen placed upon the upper pad surface. The pad itself is formed of a compressible or resilient material such as rubber or the like. An upper pad 47, also formed of rubber of the like, is mounted for movement into and out of engagement with the lower pad 44 so as to firmly clamp or grip the legs of the turkey hen or the like between the two pads. The upper or movable pad 47 is mounted on a backing plate 48 carried by a U-shaped arm 49 extending about the plate 43 and pivotally mounted between a pair of lugs 51 extending from the back of the plate 43. The movable pad 47 and U-shaped pivot arm 49 is thus adapted to be pivoted to place the pad 44 and 47 together and to pivot them apart.

The foregoing pivotal movement is accomplished herein by a hydraulic or pneumatic cylinder 56 having the casing pivotally mounted upon a bar 57 depending from the plate 43 and the piston rod pivotally connected to the U-shaped arm 49. The cylinder 56 is provided with inlet and outlet lines 58 and 59, which, in the case of a pneumatic cylinder, are connected through control means to a source of air under pressure and to exhaust means. The application of pressurized air to the line 59 will be seen to move the piston of the cylinder upward in FIG. 3, for example, so as to pivot the arm 49 and upper or movable pad 47 from the illustrated position in solid lines to the position illustrated in dashed lines, whereat the two pads 47 and 44 are in contact.

Actuation of the cylinder 56 is accomplished by control means including a valve 61 operated by a push button valve actuator 62. The valve 61 is mounted on the back side of the plate 43 with the push button 62 extending through the plate so as to be disposed closely adjacent the pads 44 and 47 when they are in contact, again as illustrated, for example, in FIG. 3. The valve 62 is interconnected with the cylinder 56 and a cource of air under pressure so that compression of the button 62 operates the valve 61 to connect the lower cylinder line 59 to the air supply and connect the upper cylinder line 58 to atmosphere. This will then cause the piston rod of the cylinder 56 to move upwardly out of the housing of the cylinder and pivot the upper pad 47 into clamping position in engagement with the lower pad 44. It will be appreciated that this operation is normally performed with the legs of a hen disposed between the pads, i.e., upon the lower pad 44 so that the upper pad 47 clamps the legs and consequently immobilizes the legs of the hen.

There is additionally provided as a portion of the control means of the present invention a second or release valve 71 mounted on an arm 72 that adjustably engages the shaft 41 at the outer end thereof away from the seat 12. This arm 72 may have an opening through the upper end thereof so as to slip over the end of the shaft 41 with a set screw 73 extending into this cutout for locking the arm or bar 72 in pivotally adjusted position. The valve 71 is carried at the lower end of the arm 72 and is operated by a valve lever 74 disposed on the side of the valve toward the seat 12. This valve lever operates the valve by knee pressure of the seated operator 21 upon the lever to pivot the lower end thereof toward the valve. The valve 71 is connected between a source of air and a pilot return operator portion of valve 61. By depressing or pivoting of the lever 74 toward the valve body air under pressure is applied to a line 58 which directs air under pressure to the pilot return operator for applying air pressure to line 58 and connecting line 59 to atmosphere. It is noted that the button 62 of valve 61 remains depressed (by friction, for example) after the valve is actuated and application of air pressure to the pilot return portion of valve 61 causes button 62 to return to the original extended position. Consequently cylinder 56 is operated to withdraw the piston rod inwardly of the cylinder housing and thus to pivot the upper pad 47 away from the lower pad 44 into the position shown in solid lines in FIG. 3, for example.

The control means for release of the clamping means 16 has been described above as valving controlling application of a pressure control signal to a pilot return portion of the control valve 61, however, a simplified structure may comprise only a pivotally mounted lever extending into convenient operating position for moving the button 62 back to extended position upon lever movement. The actuator of control valve 61 may extend from both sides or ends of the valve and thus a lever return may be simply to return the button 62 and actuate to original button-extended position.

It will be appreciated that the present invention may be operated either as a hydraulic or pneumatic system, i.e., the operating cylinder 56 may be either hydraulically or pneumatically operated. Considering pneumatic operation, it will be further appreciated that conventional filters, oilers and regulators would be employed in the system and there is illustrated a box 81 within which such pieces of equipment may be disposed. This equipment may, for example, be mounted under the seat 12 of the chair 11 with an inlet line 82 extending to an external source of air under pressure such as a compressor or the like preferably having a pressure tank associated therewith. There is also provided as a part of the insemination apparatus an air pressure line 91 having a valve 92 at the outer end thereof and an open end adapted to fit over and grip a small, hollow tube or straw 93 containing semen for the artificial insemination operation. These small tubes or straws may be provided with semen in them from a straw filler apparatus 94 preferably disposed in position to be readily accessible to the operator 21. The operator need only reach up to the filler 94 with the line 91 and slip the end of the line onto the straw which is then released from the filler with a predetermined amount of semen therein. The operator then inserts the straw in the hen oviduct and actuates the valve 92 to deliver the semen into the oviduct of the hen by carefully regulated low pressure air in the line 91. Following this operation the operator withdraws the straw and moves his knees outwardly to release the turkey. As his right knee moves outwardly, it engages the valve lever 74 to operate the clamping means for pivoting the upper pad 47 away from the lower pad 44 so that the turkey is fully released. Successive insemination operations are performed with separate straws automatically loaded in the straw filler 94 and in order to discharge the straw there is provided a tube 96 mounted on the arm 72 and depending therefrom. A small blade 97 across a part of the open top of the tube 96 provides means for the operator to catch the straw and pull it from the end of the tube so that the straw falls through the tube 96. There may be provided a container 98 into which the discharged straws fall from the tube. The blade 97 extends across a part of the top of the tube 96 below the upper end of the tube and thus the seated operator need only move the straw into the tapering corner of blade and tub side to catch the tube so that the flexible line 91 may be readily slipped from the straw end.

Utilization of the present invention for artificial insemination of poultry hens is believed to be rather clear cut from the foregoing description of the apparatus and brief introductory description. Insemination of poultry with the present invention is preferably accomplished by two people, the first of which grips the turkey by the two legs and a wing and places the turkey in the apparatus. As the turkey is placed in the apparatus between the knees of operator 21, the person so placing the turkey there presses the valve button 62 with the back of his hand so that the clamps close and grip the turkey legs, somewhat as illustrated in FIG. 1 of the drawings. At this time the operator 21 has the straw 93 with a predetermined amount of semen therein ready for use. The operator then presses his knees together to properly position the rear of the hen for insemination and, with his left hand, spreads the turkey to reveal the ovaries. With his right hand he inserts the straw 93 and presses the valve 92 so that the predetermined amount of semen in the straw is ejected under the desired pressure such as, for example, about 1 lb. per square inch, and then withdraws the straw and moves his knees outwardly so as to engage the valve lever 74 at the same time his knees release the turkey. The valve 71 is thus actuated to open the clamping means 16 so that the turkey's feet then drop to the floor or ground and the turkey departs. The operator 21 immediately removes the straw from the end of the line 91 by means of the blade 97 so that the straw drops through the tube 96 into the container 98. In substantially one continuous motion the operator 21 then reaches the line 91 up to the straw feed 94 and engages another loaded straw which he withdraws from the straw feed ready for the next insemination operation. As the operator 21 is performing the foregoing acts of replacing the straw at the end of the line 91, the other operator is placing another turkey between the seated operator's legs and clamping the turkey in position. The operator 21 then proceeds with the next artificial insemination operation.

It will be seen from the foregoing brief description of operation of the present invention that rather rapid operation is possible. Under normal circumstances a conventional and usual speed of insemination is about 600 turkeys per hour, for example. This will be seen to be a marked improvement over prior art methods of poultry insemination. It is also noted that the chair 11 may be sunken below the level of the floor or the like upon which the turkeys are provided and upon which they depart. This is advantageous in minimizing the physical effort of the first operator in lifting and placing turkeys in position for insemination. Although the straw feed 94 may be provided in a variety of different ways, it is advantageous to employ the mechanism of our copending U.S. Pat. application Ser. No. 384,937 filed Aug. 2, 1973 for "Straw Charging and Feeding apparatus." Not only does the present invention provide for materially speeding up the process of artificially inseminating poultry, but furthermore provides a materially improved operation. By precisely controlling the air pressure employed to discharge the semen into the turkey, possible damage to the turkey is precluded and, furthermore, damage to the egg in process is substantially eliminated. This, of course, is highly advantageous when it is considered that the stock of turkeys is, of course, valuable and secondly, that the egg production is a primary source of revenue of the entire operation. A materially improved insemination operation is possible with the present invention and, furthermore, the rapidity of operations is increased and the manpower required is materially reduced. As compared to conventional manual artificial insemination of turkeys, for example, the present invention provides for a reduction in manpower of about 40 percent.

Although the present invention has been described above in terms of a single preferred embodiment thereof, it is not intended to limit the invention to the precise terms of description nor details of illustration, for it will be apparent to those in the art that modifications and variations may be made within the spirit of the present invention.

What is claimed is:

1. Poultry inseminating apparatus comprising
means defining a seat for an operator,
means adjustably mounting poultry leg clamping means upon said seat,
said clamping means including a stationary pad and a movable pad pivotable by a power cylinder for pivoting the movable pad into and out of engagement with said stationary pad for removably clamping the legs of poultry, and
control means connected to said cylinder for operating the cylinder and secured to said clamping means in position for ready engagement by an operator, said control means including a first actuator disposed adjacent said stationary pad for manual movement to actuate said cylinder to clamp said pads together and a second actuator extending downwardly from said stationary pad into position for movement by knee pressure of an operator to reverse actuate said cylinder to pivot said movable pad away from said stationary pad to release the legs of poultry clamped therebetween.

2. The apparatus of claim 1 further defined by said means mounting the clamping means including a substantially vertical beam slidably engaging said seat defining means with locking means adjustably fixing the vertical position of said vertical beam, a substantially horizontal beam slidably engaging a crosspiece on said vertical beam with locking means adjustably fixing the horizontal position of said horizontal beam, a shaft extending transversly of said horizontal beam over said seat and adjustably carried by said horizontal beam, and a support plate secured to said shaft and carrying stationary and movable portions of said clamping means.

3. The apparatus of claim 2 further defined by said control means having the first cylinder actuator mounted on said support plate for pivoting the clamping means together, and the second cylinder actuator adjustably mounted on said shaft and depending therefrom to a position adjacent a side of said seat for pivoting said clamping means apart.

4. The apparatus of claim 2 further defined by said clamping means having said stationary pad mounted on said support plate, said movable pad adapted to move into and out of engagement with said lower pad, a pivot arm carrying said upper pad and pivotally mounted on said support plate, a rigid support bar secured to said support plate, and said cylinder being pivotally linked between said support bar and said pivot arm whereby cylinder operation pivots the movable pad into and out of engagement with the stationary pad.

5. Poultry insemination apparatus comprising means defining a seat for an operator, adjustable support means mounted on said seat defining means and extending over one side of said seat, clamping means including a support plate secured to said support means over said seat and carrying a stationary lower pad and a movable upper pad, with a fluid cylinder engaging the upper pad for movement thereof, and control means mounted on said support plate in position for ready engagement by an operator and connected to said cylinder for controlling operation thereof to move said pads into and out of engagement.

6. The apparatus of claim 5 further defined by said control means including a first actuator mounted on said support plate for hand operation, and a second actuator adjustably positioned below said pads for knee operation.

* * * * *